(12) United States Patent
Kim et al.

(10) Patent No.: US 12,074,635 B2
(45) Date of Patent: Aug. 27, 2024

(54) METHOD FOR OPERATING ULTRA WIDEBAND SIGNAL AND ELECTRONIC DEVICE

(71) Applicant: Samsung Electronics Co., Ltd., Suwon-si (KR)

(72) Inventors: Hyunchul Kim, Suwon-si (KR); Moonseok Kang, Suwon-si (KR); Yi Yang, Suwon-si (KR); Kunyoung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 17/885,857

(22) Filed: Aug. 11, 2022

(65) Prior Publication Data

US 2023/0032364 A1 Feb. 2, 2023

Related U.S. Application Data

(63) Continuation of application No. PCT/KR2022/010903, filed on Jul. 25, 2022.

(30) Foreign Application Priority Data

Jul. 28, 2021 (KR) .................. 10-2021-0099280
Dec. 27, 2021 (KR) .................. 10-2021-0188144

(51) Int. Cl.
*H04B 1/71* (2011.01)
*G01S 13/02* (2006.01)
(Continued)

(52) U.S. Cl.
CPC ...... *H04B 1/71635* (2013.01); *G01S 13/0209* (2013.01); *H04W 72/0446* (2013.01)

(58) Field of Classification Search
CPC .......... H04B 1/71635; G01S 13/0209; H04W 72/0446
See application file for complete search history.

(56) References Cited

U.S. PATENT DOCUMENTS 9,591,570 B2 3/2017 Kubo et al.
10,111,044 B2 10/2018 Gherardi et al.
(Continued)

FOREIGN PATENT DOCUMENTS

KR 10-2016-0129635 A 11/2016
KR 10-2021-0043642 A 4/2021
KR 10-2021-0072128 A 6/2021

*Primary Examiner* — Freshteh N Aghdam
(74) *Attorney, Agent, or Firm* — Jefferson IP Law, LLP

(57) ABSTRACT

An electronic device is provided. The electronic device includes a communication module configured to support ultra wideband (UWB) communication, and at least one processor operatively connected to the communication module, wherein the at least one processor is configured to control to transmit, to an external electronic device, a first packet including first information related to transmission of a second packet through the communication module in a slot corresponding to a transmission time of the first packet, to transmit, to the external electronic device, at least one or more second packets corresponding to the first information through the communication module in a slot corresponding to a transmission time of the second packet, wherein the first packet may be an STS packet configuration (SP) frame including a payload, and the at least one or more second packets for determining whether pointing may be an SP frame that does not include a frame payload.

20 Claims, 9 Drawing Sheets

(51) Int. Cl.
  *H04B 1/7163* (2011.01)
  *H04W 72/0446* (2023.01)

(56) References Cited

U.S. PATENT DOCUMENTS

| | | |
|---|---|---|
| 11,194,011 B2 | 12/2021 | Mutz et al. |
| 11,722,171 B2 * | 8/2023 | Subraveti ............ G01S 13/0209 |
| | | 375/130 |
| 11,882,455 B2 * | 1/2024 | Schober ................ H04W 12/63 |
| 2016/0323863 A1 | 11/2016 | Park et al. |
| 2020/0106877 A1 | 4/2020 | Ledvina et al. |
| 2020/0183000 A1 | 6/2020 | Li et al. |
| 2020/0228331 A1 * | 7/2020 | de Perthuis ........... H04L 9/0872 |
| 2020/0284893 A1 | 9/2020 | McLaughlin et al. |
| 2021/0006652 A1 | 1/2021 | Ledvina et al. |
| 2021/0014677 A1 * | 1/2021 | Han ...................... H04W 12/64 |
| 2021/0373142 A1 * | 12/2021 | Lim ...................... G01S 13/343 |

* cited by examiner

METHOD FOR OPERATING ULTRA WIDEBAND SIGNAL AND ELECTRONIC DEVICE

CROSS-REFERENCE TO RELATED APPLICATION(S)

This application is a continuation application, claiming priority under § 365(c), of an International application No. PCT/KR2022/010903, filed on Jul. 25, 2022, which is based on and claims the benefit of a Korean patent application number 10-2021-0099280, filed on Jul. 28, 2021, in the Korean Intellectual Property Office, and of a Korean patent application number 10-2021-0188144, filed on Dec. 27, 2021, in the Korean Intellectual Property Office, the disclosure of each of which is incorporated by reference herein in its entirety.

TECHNICAL FIELD

The disclosure relates to a method of operating an ultra wideband (UWB) signal and an electronic device including the method. More particularly, the disclosure relates to the disclosure relates to a method of operating an UWB signal and an electronic device that transmits a UWB signal by reducing a capacity of a payload included in the UWB signal when transmitting the UWB signal.

BACKGROUND ART

Various electronic devices, such as a smart phone, a tablet personal computer (PC), a portable multimedia player (PMP), a personal digital assistant (PDA), a laptop personal computer, and/or a wearable device, are being distributed.

In general, electronic devices may periodically broadcast a UWB signal, thereby providing services and/or information. If an electronic device having a plurality of antennas receives a UWB signal, such as a UWB advertisement message, the electronic device may identify a location of an external electronic device that has transmitted the UWB signal based on angle of arrival (AOA) information.

The above information is presented as background information only to assist with an understanding of the disclosure. No determination has been made, and no assertion is made, as to whether any of the above might be applicable as prior art with regard to the disclosure.

DISCLOSURE

Technical Problem

In case that an electronic device and an external electronic device provide a service based on a UWB signal (e.g., service based on location information), in order to improve accuracy of location information, a plurality of UWB signals may be transmitted.

In case that a plurality of UWB signals is transmitted at a designated interval, a designated time is required to receive the plurality of UWB signals, and there may occur a phenomenon that a reception performance is deteriorated according to a capacity of a payload included in the UWB signal.

Aspects of the disclosure are to address at least the above-mentioned problems and/or disadvantages and to provide at least the advantages described below. Accordingly, an aspect of the disclosure is to provide a method of operating an UWB signal and an electronic device that transmits a UWB signal by reducing a capacity of a payload included in the UWB signal when transmitting the UWB signal.

Another aspect of the disclosure is to provide a method of operating an UWB signal and an electronic device that can reduce the time required to transmit a plurality of UWB signals.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication module configured to support UWB communication, and at least one processor operatively connected to the communication module, wherein the at least one processor is configured to control to transmit, to an external electronic device, a first packet including first information related to transmission of a second packet through the communication module in a slot corresponding to a transmission time of the first packet, to transmit, to the external electronic device, at least one second packet corresponding to the first information through the communication module in a slot corresponding to a transmission time of the second packet, wherein the first packet may be a scrambled timestamp sequence (STS) packet configuration (SP) frame including a payload, and at least one second packet for determining whether pointing may be an SP frame that does not include a frame payload.

In accordance with another aspect of the disclosure, an electronic device is provided. The electronic device includes a communication module configured to support UWB communication, and at least one processor operatively connected to the communication module, wherein the at least one processor is configured to control to receive a first packet including first information related to transmission of at least one or more second packets from an external electronic device in a slot corresponding to a transmission time of the first packet through the communication module, to receive the at least one second packet corresponding to the first information from the external electronic device in a slot corresponding to a transmission time of the at least one or more second packets through the communication module, and to determine whether the electronic device points the external electronic device based on the first packet and/or the at least one second packet, wherein the first packet is an SP frame including a payload, and the at least one or more second packets is an SP frame that does not include a payload.

Advantageous Effects

A method of operating an UWB signal and an electronic device according to various embodiments of the disclosure can improve accuracy of angle of arrival (AOA) measurement that determines a location of an external electronic device.

A method of operating an UWB signal and an electronic device according to various embodiments of the disclosure can reduce latency required for determining a location of an external electronic device.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
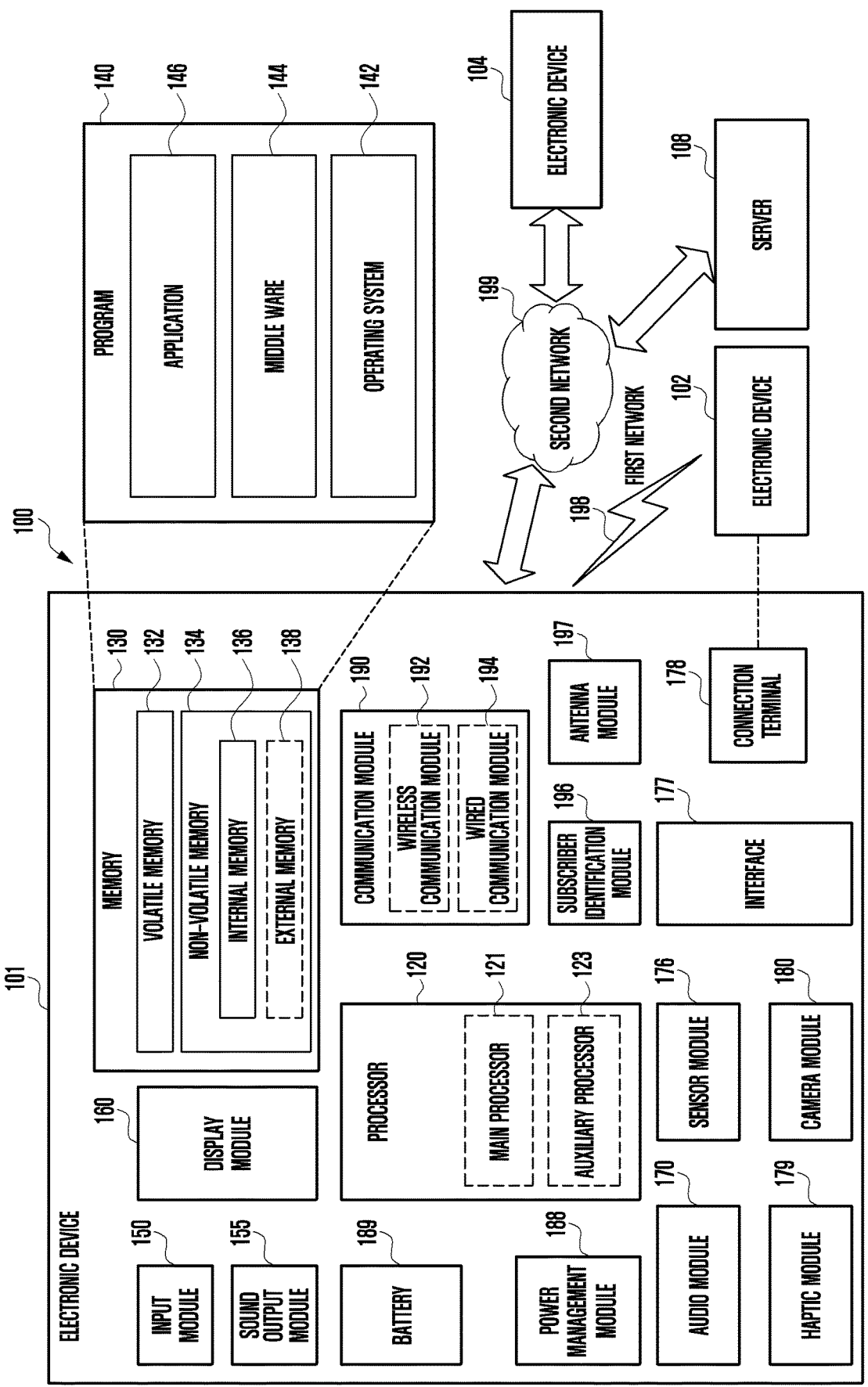
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module)

or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
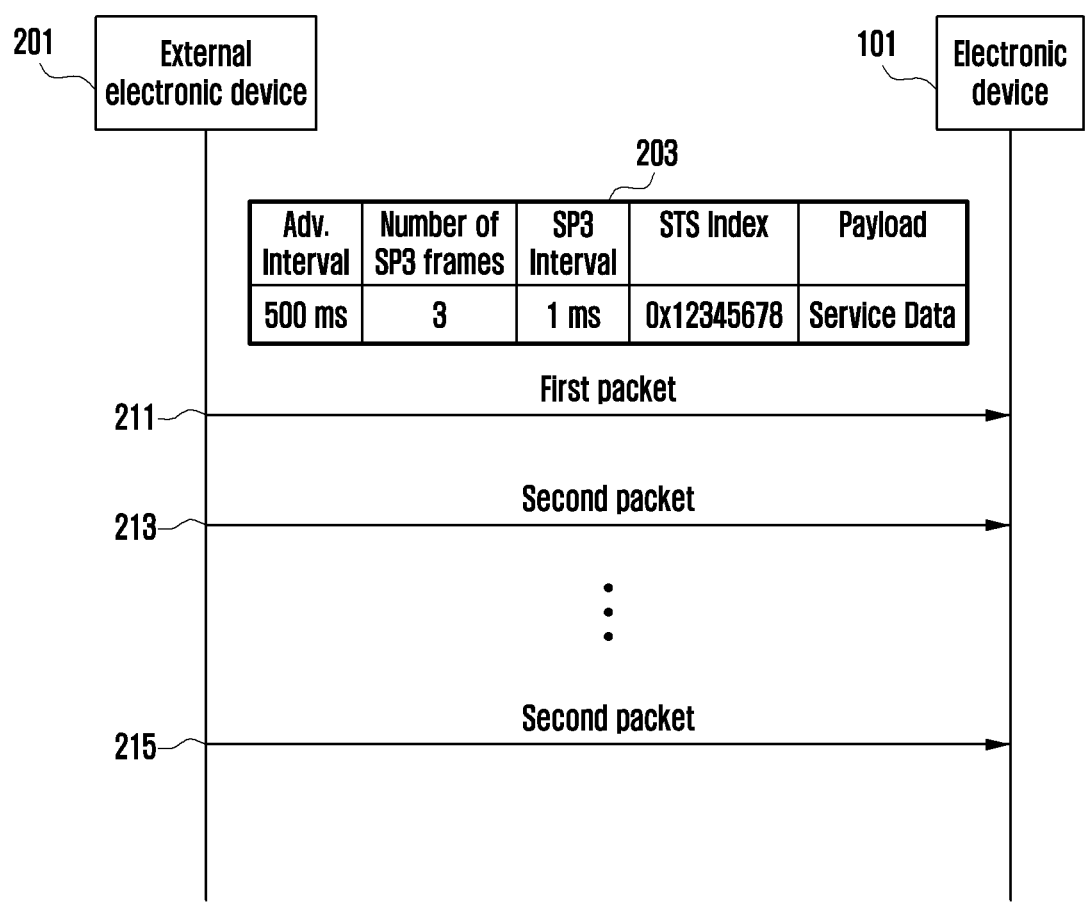
FIG. 2 is a message flow diagram illustrating an operation of transmitting and receiving an ultra wideband (UWB) signal between an electronic device and an external electronic device according to an embodiment of the disclosure.

FIG. 2 is a message flow diagram illustrating an operation of transmitting and receiving an ultra wideband (UWB) signal between an electronic device and an external electronic device according to an embodiment of the disclosure.

Referring to FIG. 2, in an embodiment of the disclosure, the electronic device 101 may include an antenna module 197, a communication module 190, and a processor 120.

In an embodiment of the disclosure, the electronic device 101 may transmit or receive a signal using a specific communication standard. The specific communication standard may include, for example, ultra wideband (hereinafter, UWB communication). UWB may refer to various communication methods of transmitting information using a wider frequency band (e.g., a frequency band from 3.1 GHz to 10 GHz) than that of other communication methods.

In an embodiment of the disclosure, the communication module 190 may be electrically connected to the processor 120, and transmit a signal received through the antenna module 197 to the processor 120. The communication module 190 may be electrically connected to the antenna module 197 and transmit a signal including data to be transmitted through the UWB communication to the antenna module 197.

In an embodiment of the disclosure, the processor 120 may be at least one processor of a communication processor (e.g., the auxiliary processor 123 of FIG. 1) or an application processor (e.g., the main processor 121 of FIG. 1).

In an embodiment of the disclosure, the processor 120 may determine a location of the external electronic device 201 through UWB communication using a signal output from the antenna module 197 and/or a signal received in the antenna module 197 through a UWB communication method.

In an embodiment of the disclosure, the processor 120 may establish a UWB communication connection with the external electronic device 201. The processor 120 may exchange UWB parameters for UWB communication connection with the external electronic device 201 during an establishment operation.

In an embodiment of the disclosure, the processor 120 may exchange UWB parameters through UWB communication or other communication methods (out of band, OOB) (e.g., short-range communication methods including Bluetooth and Wi-Fi). The UWB parameter may include information on a location measurement period (e.g., ranging interval) between the electronic device 101 and the external electronic device 201.

In an embodiment of the disclosure, the processor 120 may perform an operation of determining a location of the external electronic device 201 corresponding to completing the UWB communication connection.

In an embodiment of the disclosure, the external electronic device 201 may include an antenna module (the antenna module 197 of FIG. 1), a communication module (the communication module 190 of FIG. 1), and a processor (the processor 120 of FIG. 1).

In an embodiment of the disclosure, the external electronic device 201 may transmit or receive a signal using a specific communication standard. The specific communication standard may include, for example, ultra wideband (hereinafter, UWB communication).

In an embodiment of the disclosure, the communication module (the communication module 190 of FIG. 1) of the external electronic device 201 may be electrically connected to the processor (the processor 120 of FIG. 1) of the external electronic device 201, and transmit a signal received through the antenna module (the antenna module 197 of FIG. 1) of the external electronic device 201 to the processor (the processor 120 of FIG. 1) of the external electronic device 201. The communication module (the communication module 190 of FIG. 1) of the external electronic device 201 may be electrically connected to the antenna module (the antenna module 197 of FIG. 1) of the external electronic device 201 and transmit a signal including data to be transmitted through UWB communication to the antenna module (the antenna module 197 of FIG. 1) of the external electronic device 201.

In an embodiment of the disclosure, in operation 211, the external electronic device 201 may transmit a first packet to the electronic device 101 through the communication module (the communication module 190 of FIG. 1) under the control of the processor (the processor 120 of FIG. 1).

In an embodiment of the disclosure, in operation 211, the electronic device 101 may receive the first packet through the communication module 190 under the control of the processor 120.

In various embodiments of the disclosure, in operation 211, the external electronic device 201 and the electronic device 101 may transmit and receive a first packet in a first slot (e.g., slot 0).

In an embodiment of the disclosure, the first packet and/or the second packet may be an ultra wideband advertisement (UWB advertisement).

In an embodiment of the disclosure, the first packet may include first information related to transmission of the second packet.

In an embodiment of the disclosure, the first packet may be a scrambled timestamp sequence (STS) packet configuration (SP) frame including a payload.

For example, the first packet may be an SP0 frame, an SP1 frame, or an SP2 frame.

In an embodiment of the disclosure, the second packet may be an STS packet configuration (SP) frame that does not include a payload.

For example, the second packet may be an SP3 frame.

In an embodiment of the disclosure, first information related to transmission of the second packet may be included in a physical layer payload of the first packet, for example, an SP0 frame, an SP1 frame, or an SP2 frame.

In an embodiment of the disclosure, the first information related to transmission of the second packet may include information on the number of times of transmission of the second packet, information on a transmission time interval of a UWB advertisement, information on a transmission time interval of the second packet, and/or scrambled timestamp sequence (STS) index information, as in first data 203.

In various embodiments of the disclosure, the first information related to transmission of the second packet may essentially include information on the number of times of transmission of the second packet and may include at least one of information on a transmission time interval of a UWB advertisement, information on a transmission time interval of the second packet, and/or scrambled timestamp sequence index information.

In an embodiment of the disclosure, the first information related to transmission of the second packet may include information on the number of times of transmission of the second packet. The information on the number of times of transmission of the second packet may be information on the number of times of transmission of the second packet when transmitting a UWB advertisement. The number of times of transmission of the second packet may be, for example, three times. However, the number of times of transmission of the second packet is not limited to three times, but may be one time or more than one time.

In various embodiments of the disclosure, the first information related to transmission of the second packet may include information on the number of times of transmission of the SP3 frame.

In an embodiment of the disclosure, information on a transmission time interval of a UWB advertisement may relate to a transmission time of a UWB advertisement. The transmission time interval of a UWB advertisement may be a time interval that transmits a first packet and a second packet. For example, a transmission time of the UWB advertisement may be 500 ms.

In an embodiment of the disclosure, information on a transmission time interval of the second packet may relate to a transmission time interval between second packets in case that two or more second packets are transmitted. The information on a transmission time interval of the second packet may be information on a slot duration. For example, the transmission time interval of the second packet may be 1 ms. The slot duration may be 1 ms.

In an embodiment of the disclosure, the external electronic device 201 may sequentially transmit second packets, one for each slot according to information on the number of times of transmission of the second packet included in first information from a slot following a slot (e.g., first slot (slot 0)) in which the first packet is transmitted.

In various embodiments of the disclosure, the external electronic device 201 may be configured to transmit a second packet once every several slots (e.g., second slot (slot 1), third slot (slot 2), and fourth slot (slot 3)) from a slot following a slot (e.g., first slot (slot 0)) in which the first packet is transmitted.

In various embodiments of the disclosure, the external electronic device 201 may be configured to transmit a plurality of second packets in one slot (e.g., second slot (slot 1)) from a slot following a slot (e.g., first slot (slot 0)) in which the first packet is transmitted.

In an embodiment of the disclosure, the scrambled timestamp sequence (STS) index information may be a scrambled timestamp sequence index value to be used in the second packet. The SP frame may be transmitted and received in a sequence of pulses generated according to a scrambled timestamp sequence index. Based on a scrambled timestamp sequence index value, a device that has transmitted a UWB advertisement may be identified.

In an embodiment of the disclosure, the SP0 frame may include a MAC layer packet header (MHR). The SP0 frame may include a source address in the MAC layer packet header. The external electronic device 201 and/or the electronic device 101 may identify a device that has transmitted the UWB advertisement based on the source address.

In an embodiment of the disclosure, in operations 213 and 215, the external electronic device 201 may transmit a second packet to the electronic device 101 through the communication module (e.g., the communication module 190 of FIG. 1) under the control of a processor (e.g., the processor 120 of FIG. 1).

Operations 213 and 215 may be an operation in which the external electronic device 201 transmits the second packet to the electronic device 101 through the communication module (e.g., the communication module 190 of FIG. 1) under the control of the processor (e.g., the processor 120 of FIG. 1) based on the first information included in the first packet.

Operations 213 and 215 may be an operation in which the external electronic device 201 transmits the second packet to the electronic device 101 through the communication module (e.g., the communication module 190 of FIG. 1) under the control of the processor (e.g., the processor 120 of FIG. 1) based on information on the number of times of transmission of the second packet defined in the first information included in the first packet, information on a transmission time interval of a UWB advertisement, information on a transmission time interval of the second packet, and/or scrambled timestamp sequence (STS) index information.

In an embodiment of the disclosure, in operation 213, the external electronic device 201 may transmit the second packet to the electronic device 101 through the communication module (the communication module 190 of FIG. 1) under the control of the processor (the processor 120 of FIG. 1).

In an embodiment of the disclosure, in operation 215, the external electronic device 201 may transmit the second packet to the electronic device 101 through the communication module (the communication module 190 of FIG. 1) under the control of the processor (the processor 120 of FIG. 1).

In an embodiment of the disclosure, in operation 213, the electronic device 101 may receive the second packet through the communication module 190 under the control of the processor 120.

In an embodiment of the disclosure, in operation 215, the electronic device 101 may receive the second packet through the communication module 190 under the control of the processor 120.

In various embodiments of the disclosure, in operation 213, the external electronic device 201 and the electronic device 101 may transmit and receive the second packet in the second slot (e.g., slot 1). For example, when a designated time (e.g., a transmission time interval of a UWB advertisement) has elapsed after transmitting the first packet in operation 211, the external electronic device 201 may transmit the second packet and the electronic device 101 may receive the second packet in operation 213.

In various embodiments of the disclosure, in operation 215, the external electronic device 201 and the electronic device 101 may transmit and receive the second packet in the third slot (e.g., slot 2). For example, when a designated time (e.g., a transmission time interval of the second packet) has elapsed after transmitting the second packet in operation 213, the external electronic device 201 may transmit the second packet and the electronic device 101 may receive the second packet in operation 215.

A slot of the disclosure is a time slot in a time division unit of transmitted data, and a specific time slot may be repeatedly used in one channel for every frame.

The electronic device 101 and the external electronic device 201 supporting UWB communication may communicate using a packet format and a physical layer protocol data unit (PPDU) frame. The frame may include a synchronization header (SHR), a physical layer header (PHR), and a physical layer payload (PHY payload). The synchronization header (SHR) may include a synchronization field (SYNC) and a start of frame delimiter (SFD) having a variable length.

UWB communication may include an encrypted sequence that prevents an external attacker from accessing or manipulating UWB communication in a physical layer (PHY). An operation of detecting pointing of an external electronic device by estimating an angle of arrival may be vulnerable to manipulation. UWB communication can improve security by adding randomness of encryption keys and numbers to physical layer (PHY) packets.

The STS packet configuration (SP) frame may include a scrambled timestamp sequence (STS). The scrambled timestamp sequence may be constituted with a pseudo-random pulse sequence created in AES-128.

An STS packet configuration zero (SP0) frame may include a synchronization header (SHR), a physical layer header (PHR), and a physical layer payload (PHY payload).

The STS packet configuration zero (SP0) frame may be a packet formed in order of a synchronization header (SHR), a physical layer header (PHR), and a physical layer payload (PHY payload).

An STS packet configuration one (SP1) frame may include a synchronization header (SHR), a scrambled timestamp sequence (STS), a physical layer header (PHR), and a physical layer payload (PHY payload).

The STS packet configuration one (SP1) frame may be a packet formed in order of a synchronization header (SHR), a scrambled timestamp sequence (STS), a physical layer header (PHR), and a physical layer payload (PHY payload).

An STS packet configuration two (SP2) frame may include a synchronization header (SHR), a physical layer header (PHR), a physical layer payload (PHY payload), and a scrambled timestamp sequence (STS).

The STS packet configuration two (SP2) frame may be a packet formed in order of a synchronization header (SHR), a physical layer header (PHR), a physical layer payload (PHY payload), and a scrambled timestamp sequence (STS).

An STS packet configuration three (SP3) frame may include a synchronization header (SHR) and a scrambled timestamp sequence (STS).

The STS packet configuration three (SP3) frame may be a packet formed in order of a synchronization header (SHR) and a scrambled timestamp sequence (STS).

Figure 3:
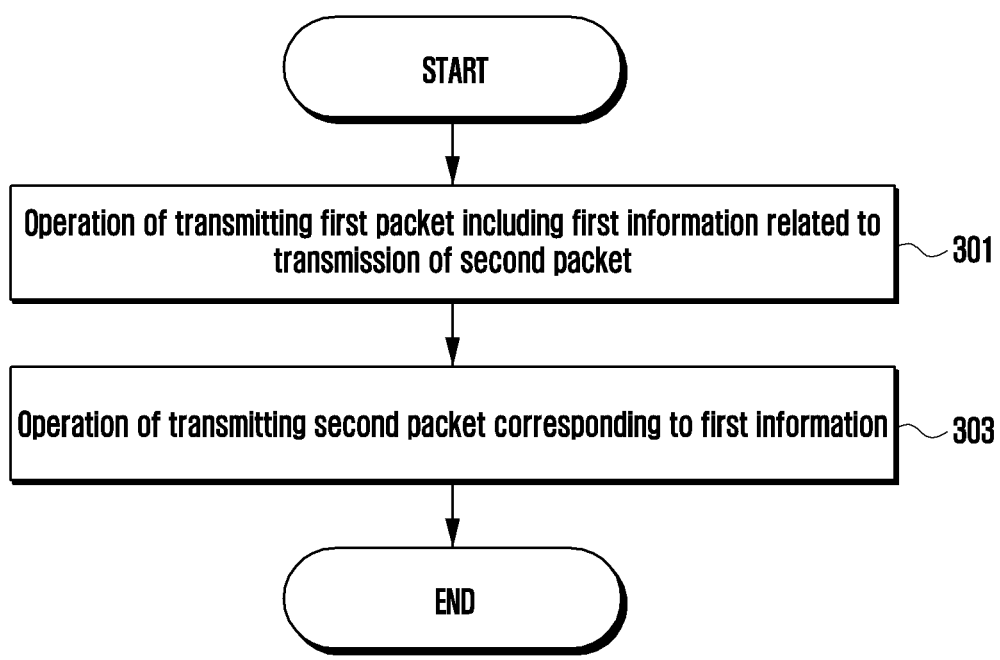
FIG. 3 is a flowchart illustrating an operation in which an external electronic device of FIG. 2 transmits a UWB signal according to an embodiment of the disclosure.

FIG. 3 is a flowchart illustrating an operation in which an external electronic device transmits a UWB signal according to an embodiment of the disclosure.

Referring to FIG. 3, in operation 301, the external electronic device 201 may transmit a first packet including first information related to transmission of the second packet to the electronic device 101 through the communication module (the communication module 190 of FIG. 1) under the control of the processor (the processor 120 of FIG. 1).

In operation 301, the external electronic device 201 may transmit a first packet including first information related to transmission of a second packet to the electronic device 101 in a first slot (e.g., slot0) through the communication module (the communication module 190 of FIG. 1) under the control of the processor (the processor 120 of FIG. 1).

In an embodiment of the disclosure, the first packet and/or the second packet may be an ultra wideband advertisement (UWB advertisement).

In an embodiment of the disclosure, the first packet may be an STS packet configuration (SP) frame including a payload.

For example, the first packet may be an SP0 frame, an SP1 frame, or an SP2 frame.

In an embodiment of the disclosure, the second packet may be an STS packet configuration (SP) frame that does not include a payload.

For example, the second packet may be an SP3 frame.

In an embodiment of the disclosure, first information related to transmission of the second packet may be included in a physical layer payload of the first packet, for example, the SP0 frame, the SP1 frame, or the SP2 frame.

In an embodiment of the disclosure, the first information related to transmission of the second packet may include information on the number of times of transmission of the second packet. The information on the number of times of transmission of the second packet may be information on the number of times of transmission of the second packet when transmitting a UWB advertisement. The number of times of transmission of the second packet may be, for example, three times. However, the number of times of transmission of the second packet is not limited to three times, but may be one time or more than one time.

In various embodiments of the disclosure, first information related to transmission of the second packet may include information on the number of times of transmission of the second packet, information on a transmission time interval of a UWB advertisement, information on a transmission time interval of the second packet, and/or scrambled timestamp sequence index information.

In various embodiments of the disclosure, first information related to transmission of the second packet may essentially include information on the number of times of transmission of the second packet and include at least one of information on a transmission time interval of a UWB advertisement, information on a transmission time interval of the second packet, and/or scrambled timestamp sequence index information.

In an embodiment of the disclosure, in operation 303, the external electronic device 201 may transmit a second packet corresponding to the first information through the communication module (the communication module 190 of FIG. 1) under the control of the processor (the processor 120 of FIG. 1).

In various embodiments of the disclosure, in operation 303, the external electronic device 201 may transmit a second packet according to the number of times of transmission of the second packet included in the first information through the communication module (the communication module 190 of FIG. 1) under the control of the processor (the processor 120 of FIG. 1).

In an embodiment of the disclosure, the external electronic device 201 may sequentially transmit second packets, one for each slot according to information on the number of times of transmission of the second packet included in the first information from a slot following a slot (e.g., first slot (slot 0)) in which the first packet is transmitted.

In various embodiments of the disclosure, the external electronic device 201 may be configured to transmit a second packet once every several slots (e.g., second slot (slot 1), third slot (slot 2), and fourth slot (slot 3)) from a slot following a slot (e.g., first slot (slot 0)) in which the first packet is transmitted.

In various embodiments of the disclosure, the external electronic device 201 may be configured to transmit a plurality of second packets in one slot (e.g., second slot (slot 1)) from a slot following a slot (e.g., first slot (slot 0)) in which the first packet is transmitted.

Figure 4:
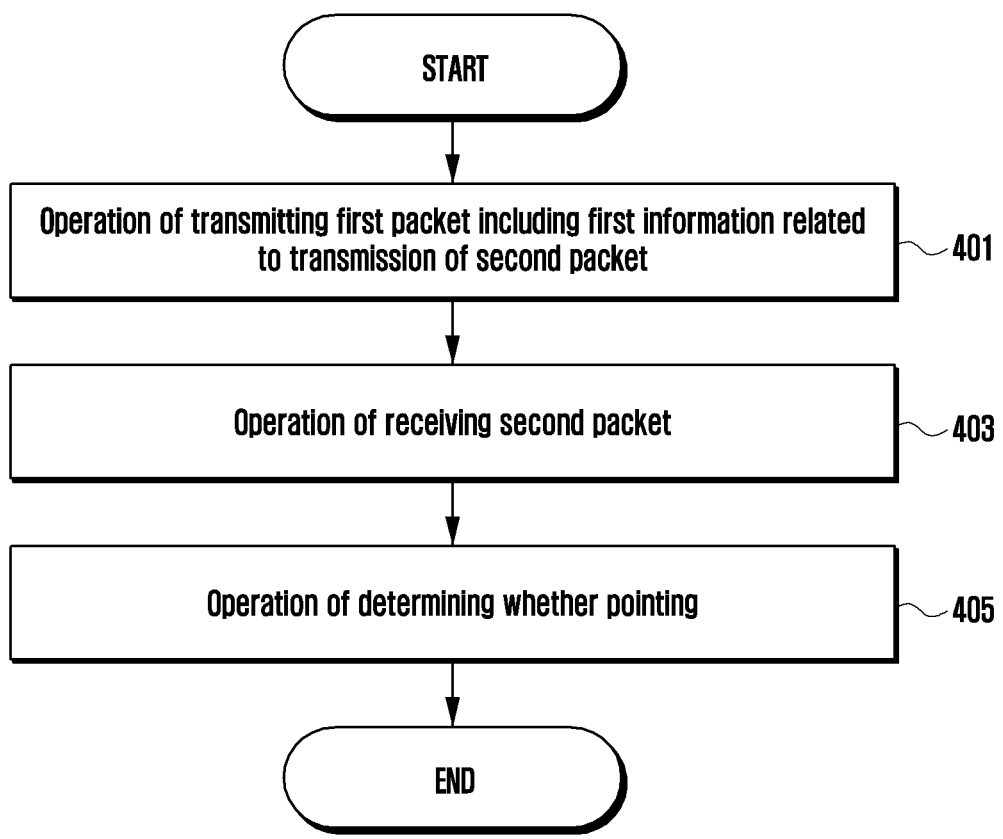
FIG. 4 is a flowchart illustrating an operation in which an electronic device of FIG. 2 manages a UWB signal according to an embodiment of the disclosure.

FIG. 4 is a flowchart illustrating an operation in which an electronic device manages a UWB signal according to an embodiment of the disclosure.

Referring to FIG. 4, in operation 401, the electronic device 101 may receive a first packet including first information related to transmission of a second packet through the communication module 190 under the control of the processor 120.

In an embodiment of the disclosure, first information related to transmission of the second packet may include information on the number of times of transmission of the second packet, information on a transmission time interval of a UWB advertisement, information on a transmission time interval of the second packet, and/or scrambled timestamp sequence index information.

In various embodiments of the disclosure, first information related to transmission of the second packet may essentially include information on the number of times of transmission of the second packet and include at least one of information on a transmission time interval of a UWB advertisement, information on a transmission time interval of the second packet, and/or scrambled timestamp sequence index information.

In an embodiment of the disclosure, the first information related to transmission of the second packet may include information on the number of times of transmission of the second packet. The information on the number of times of transmission of the second packet may be information on the number of times of transmission of the second packet when transmitting a UWB advertisement. The number of times of transmission of the second packet may be, for example, three times. However, the number of times of transmission of the second packet is not limited to three times, but may be one time or more than one time.

In an embodiment of the disclosure, in operation 403, the electronic device 101 may receive the second packet through the communication module 190 under the control of the processor 120.

In various embodiments of the disclosure, in operation 403, the electronic device 101 may receive at least one second packet corresponding to the first information through the communication module 190 under the control of the processor 120.

In various embodiments of the disclosure, in operation 403, the electronic device 101 may receive the second packet according to the number of times of transmission of the second packet included in the first information through the communication module 190 under the control of the processor 120.

In an embodiment of the disclosure, the first packet may be an STS packet configuration (SP) frame including a payload.

For example, the first packet may be an SP0 frame, an SP1 frame, or an SP2 frame.

In an embodiment of the disclosure, the second packet may be an STS packet configuration (SP) frame that does not include a payload.

For example, the second packet may be an SP3 frame.

In an embodiment of the disclosure, the first information related to transmission of the second packet may be included in a physical layer payload of the first packet, for example, the SP0 frame, the SP1 frame, or the SP2 frame.

According to various embodiments of the disclosure, the electronic device 101 may sequentially receive the second packet for each slot according to information on the number of times of transmission of the second packet included in the first information from a slot following a slot (e.g., first slot (slot 0)) in which the first packet is transmitted.

In various embodiments of the disclosure, the electronic device 101 may receive the second packet once every several slots (e.g., second slot (slot 1), third slot (slot 2), and fourth slot (slot 3)) from a slot following a slot (e.g., first slot (slot 0)) in which the first packet is transmitted.

In various embodiments of the disclosure, the electronic device 101 may receive a plurality of second packets in one slot (e.g., second slot (slot 1)) from a slot following a slot (e.g., first slot (slot 0)) in which the first packet is transmitted.

In an embodiment of the disclosure, in operation 405, the electronic device 101 may determine whether the external electronic device 201 has been pointed under the control of the processor 120.

In an embodiment of the disclosure, the pointing of the external electronic device 201 may be an operation of the electronic device 101 toward the external electronic device 201. In operation 405, the electronic device 101 may estimate an angle of arrival based on the first packet and/or the second packet under the control of the processor 120 to determine whether the external electronic device 201 has been pointed.

In an embodiment of the disclosure, in operation 405, the electronic device 101 may determine whether the external electronic device 201 has been pointed based on the first packet and/or the second packet under the control of the processor 120.

In an embodiment of the disclosure, when receiving the first packet and/or the second packet under the control of the processor 120 in operation 405, the electronic device 101 may determine whether the electronic device 201 has been pointed based on the first packet and/or the second packet.

In an embodiment of the disclosure, in operation 405, the electronic device 101 may determine whether the second packet has been received from the external electronic device 201 based on the first information included in the first packet under the control of the processor 120 to determine whether the external electronic device 201 has been pointed.

In an embodiment of the disclosure, when receiving the second packet from the external electronic device 201 based on the first information included in the first packet under the control of the processor 120 in operation 405, the electronic device 101 may identify an angle of arrival and/or a field of view of the first packet and/or the second packet. In operation 405, when it is determined that the first packet and/or the second packet have been received in a preconfigured angle of arrival range and/or field of view range under the control of the processor 120, the electronic device 101 may determine that the external electronic device 201 has been pointed.

In an embodiment of the disclosure, when receiving the second packet from the external electronic device 201 based on first information included in the first packet, in operation 405, the electronic device 101 may identify an angle of arrival and/or a field of view of the first packet and/or the second packet under the control of the processor 120. In operation 405, when it is determined that the first packet and/or the second packet have not been received in a preconfigured angle of arrival range and/or field of view range under the control of the processor 120, the electronic device 101 may determine that the external electronic device 201 has not been pointed.

In an embodiment of the disclosure, the first information may be information on the number of times of transmission of the second packet of the external electronic device 201.

In an embodiment of the disclosure, if the number of times of transmission of the second packet included in the first information matches the number of times of the received second packet, in operation 405, the electronic device 101 may identify an angle of arrival and/or a field of view of the first packet and/or the second packet under the control of the processor 120. In operation 405, the electronic device 101 may determine whether the external electronic device 201 has been pointed based on the identified angle of arrival and/or field of view of the first packet and/or the second packet under the control of the processor 120.

For example, when information on the number of times of transmission of the second packet of the external electronic device 201 included in the first information is defined as transmitting the second packet three times, and when it is identified that the external electronic device 201 has transmitted the second packet three times, in operation 405, the electronic device 101 may identify an angle of arrival and/or a field of view of the first packet and/or the second packet under the control of the processor 120 and determine whether the external electronic device 201 has been pointed based on the identified angle of arrival and/or field of view of the first packet and/or the second packet.

In an embodiment of the disclosure, the first information may be information on the number of times of transmission of the second packet and information on a transmission time interval of the second packet of the external electronic device 201.

In an embodiment of the disclosure, if the number of times of transmission of the second packet included in the first information matches the number of times of the received second packet, and if a transmission time interval of the second packet included in the first information matches a transmission time interval of the received second packet, in operation 405, the electronic device 101 may identify an angle of arrival and/or a field of view of the first packet and/or the second packet under the control of the processor 120 and determine whether the external electronic device 201 has been pointed based on the identified angle of arrival and/or field of view of the first packet and/or the second packet.

For example, information on the number of times of transmission of the second packet of the external electronic device 201 included in the first information may be defined as transmitting the second packet three times, and information on a transmission time interval of the second packet may be defined as transmitting the second packet at an interval of 1 ms. When it is identified that the external electronic device 201 has transmitted the second packet three times at an interval of 1 ms, in operation 405, the electronic device 101 may identify an angle of arrival and/or a field of view of the first packet and/or the second packet under the control of the processor 120, and determine whether the external electronic device 201 has been pointed based on the identified angle of arrival and/or field of view of the first packet and/or the second packet.

In an embodiment of the disclosure, the first information may include information on the number of times of transmission of the second packet and scrambled timestamp sequence index information. In operation 405, the electronic device 101 may determine whether the external electronic device 201 has been pointed based on information on the number of times of transmission of the second packet, scrambled timestamp sequence index information included in the first information, and a scrambled timestamp sequence index value included in the second packet under the control of the processor 120.

For example, the number of times of reception of the second packet may match information on the number of times of transmission of the second packet included in the first information, and scrambled timestamp sequence index information may match a scrambled timestamp sequence index value of the second packet. If the number of times of transmission and the scrambled timestamp sequence index match, in operation 405, the electronic device 101 may identify an angle of arrival and/or a field of view of the first packet and/or the second packet under the control of the processor 120 and determine whether the external electronic device 201 has been pointed based on the identified angle of arrival and/or field of view of the first packet and/or the second packet.

In an embodiment of the disclosure, the first information may be information on a range of the number of times of transmission of the second packet of the external electronic device 201.

In an embodiment of the disclosure, if the number of times of the received second packet matches in a range of the number of times of transmission of the second packet included in the first information, in operation 405, the electronic device 101 may identify an angle of arrival and/or a field of view of the first packet and/or the second packet under the control of the processor 120, and determine whether the external electronic device 201 has been pointed based on the identified angle of arrival and/or field of view of the first packet and/or the second packet.

In an embodiment of the disclosure, the first information may be information on the number of times of transmission of the second packet and information on a transmission time interval of the second packet of the external electronic device 201.

In an embodiment of the disclosure, if the number of times of the received second packet matches in a range of the number of times of transmission of the second packet included in the first information, and if transmission time intervals of the received second packet match in a range of a transmission time interval of the second packet included in the first information, in operation 405, the electronic device 101 may identify an angle of arrival and/or a field of view of the first packet and/or the second packet under the control of the processor 120, and determine whether the external electronic device 201 has been pointed based on the identified angle of arrival and/or field of view of the first packet and/or the second packet. In an embodiment of the disclosure, if the number of times of transmission of the second packet and the number of times of the received second packet included in the first information are equal to or greater than the designated number of times, in operation 405, the electronic device 101 may identify an angle of arrival and/or a field of view of the first packet and/or the second packet under the control of the processor 120. In operation 405, the electronic device 101 may determine whether the external electronic device 201 has been pointed based on the identified angle of arrival and/or field of view of the first packet and/or the second packet under the control of the processor 120.

For example, when information on the number of times of transmission of the second packet of the external electronic device 201 included in the first information is defined as transmitting the second packet three times, and when it is identified that the electronic device 101 has received the second packet 2 times or more, in operation 405, the electronic device 101 may identify an angle of arrival and/or a field of view of the first packet and/or the second packet under the control of the processor 120 and determine whether the external electronic device 201 has been pointed based on the identified angle of arrival and/or field of view of the first packet and/or the second packet.

Figure 5:
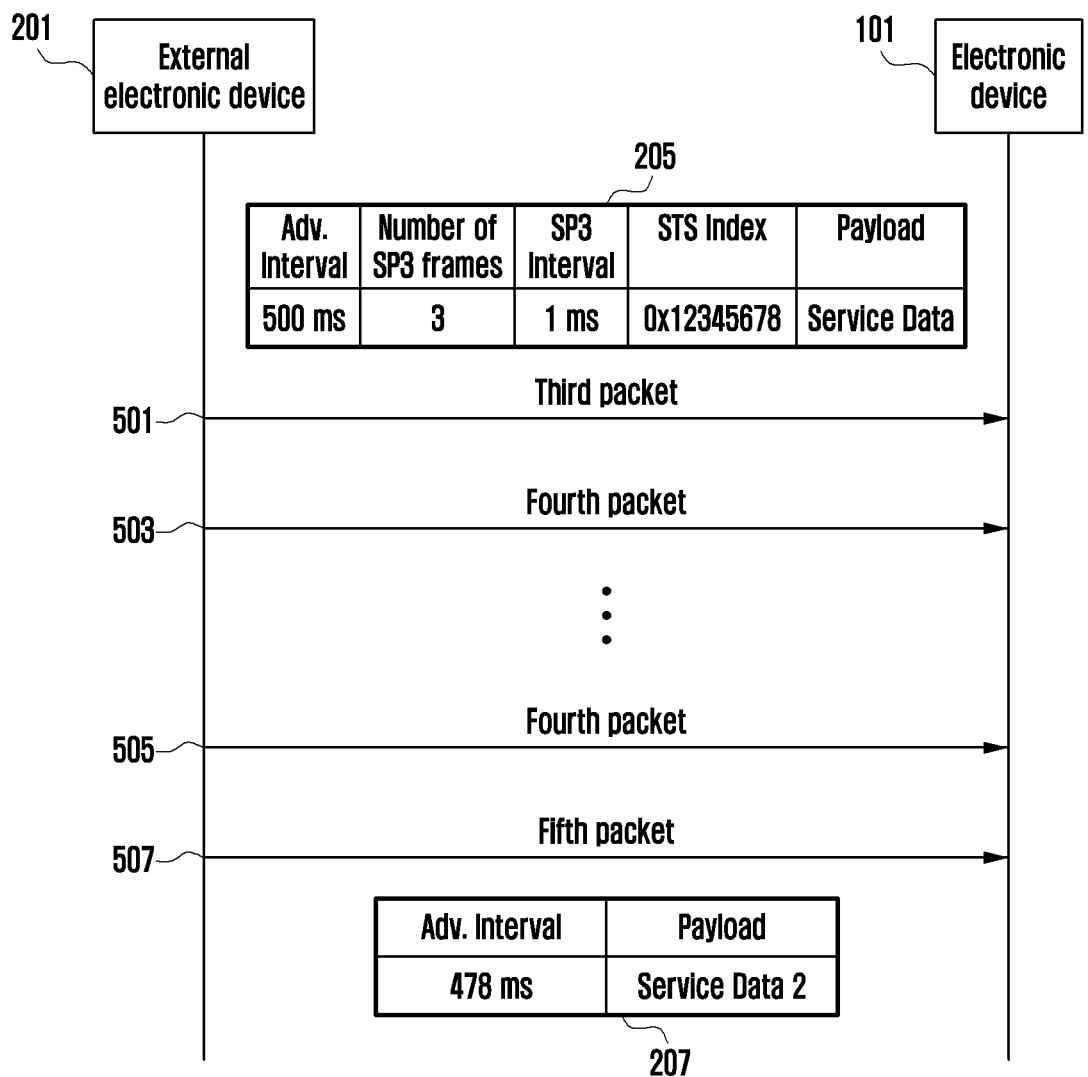
FIG. 5 is a diagram illustrating an operation of transmitting and receiving an UWB signal between an electronic device and an external electronic device according to an embodiment of the disclosure.

FIG. 5 is a diagram illustrating an operation of transmitting and receiving an ultra wideband (UWB) signal between an electronic device and an external electronic device according to an embodiment of the disclosure.

Referring to FIG. 5, the electronic device 101 and the external electronic device 201 of FIG. 5 are the same as the electronic device 101 and the external electronic device 201 of FIG. 2, and only information of a transmitted packet may be different. In the description of FIG. 5, contents overlapping with FIG. 2 may be omitted.

In an embodiment of the disclosure, in operation 501, the external electronic device 201 may transmit a third packet to the electronic device 101 through the communication module (the communication module 190 of FIG. 1) under the control of the processor (the processor 120 of FIG. 1).

In an embodiment of the disclosure, in operation 501, the electronic device 101 may receive the third packet through the communication module 190 under the control of the processor 120.

In various embodiments of the disclosure, in operation 501, the external electronic device 201 and the electronic device 101 may transmit and receive the third packet in a first slot (e.g., slot 0).

In an embodiment of the disclosure, the third packet and/or a fourth packet may be a UWB advertisement.

In an embodiment of the disclosure, the third packet may include data and second information related to transmission of the fourth packet.

In an embodiment of the disclosure, the third packet may be an STS packet configuration (SP) frame including a payload.

For example, the third packet may be an SP0 frame, an SP1 frame, or an SP2 frame.

In an embodiment of the disclosure, the fourth packet may be an STS packet configuration (SP) frame that does not include a payload.

For example, the fourth packet may be an SP3 frame.

In an embodiment of the disclosure, second information related to transmission of the fourth packet may be included in a physical layer payload of the third packet, for example, the SP0 frame, the SP1 frame, or the SP2 frame.

In an embodiment of the disclosure, data included in the third packet may be included in a physical layer payload of the third packet, for example, the SP0 frame, the SP1 frame, or the SP2 frame.

In an embodiment of the disclosure, data may be transmitted from the external electronic device 201 to the electronic device 101 through a physical layer payload of the third packet.

In an embodiment of the disclosure, data transmitted from the external electronic device 201 to the electronic device 101 may be transmitted only in the third packet. The data may be service data.

In various embodiments of the disclosure, data transmitted from the external electronic device 201 to the electronic device 101 may be divided and transmitted through at least one or more additional packets (e.g., fifth packet) as well as the third packet. Data included in the additional packet may be continuous with data included in the third packet. The number of at least one or more additional packets may be determined according to the divided data. The external electronic device 201 may divide data based on a length of data and determine the number of at least one additional packet under the control of the processor (the processor 120 of FIG. 1). The external electronic device 201 may transmit at least one or more additional packets to the electronic device 101 through the communication module (the communication module 190 of FIG. 1) after transmitting the fourth packet under the control of the processor (the processor 120 of FIG. 1).

In various embodiments of the disclosure, data included in the additional packet may be discontinuous with data included in the third packet.

In an embodiment of the disclosure, second information related to transmission of the fourth packet may include information on the number of times of transmission of the fourth packet, information on a transmission time interval of a UWB advertisement, information on a transmission time interval of the fourth packet, and/or scrambled timestamp sequence index information.

For example, second information related to transmission of the fourth packet may include information on the number of times of transmission of the fourth packet, information on a transmission time interval of a UWB advertisement, information on a transmission time interval of the fourth packet, and/or scrambled timestamp sequence index information, as in second data 205. In various embodiments of the disclosure, the second information related to transmission of the fourth packet may essentially include information on the number of times of transmission of the fourth packet and may include at least one of information on a transmission time interval of a UWB advertisement, information on a transmission time interval of the fourth packet, and/or scrambled timestamp sequence index information.

In an embodiment of the disclosure, second information related to transmission of the fourth packet may include information on the number of times of transmission of the fourth packet. The information on the number of times of transmission of the fourth packet may be information on the number of times of transmission of the fourth packet when transmitting the UWB advertisement. The number of times of transmission of the fourth packet may be, for example, three times. However, the number of times of transmission of the fourth packet is not limited to three times, but may be one time or more than one time.

In various embodiments of the disclosure, second information related to transmission of the fourth packet may include information on the number of times of transmission of the SP3 frame.

In an embodiment of the disclosure, information on a transmission time interval of a UWB advertisement may relate to a transmission time of a UWB advertisement. The transmission time interval of a UWB advertisement may be a transmission time interval of the third packet and the fourth packet. For example, the transmission time of an ultra wideband advertisement (UWB) may be 500 ms.

In an embodiment of the disclosure, when two or more fourth packets are transmitted, information on a transmission time interval of the fourth packet may relate to a transmission time interval between the fourth packets. The information on a transmission time interval of the fourth packet may be information on a slot duration. For example, the transmission time interval of the fourth packet may be 1 ms. The slot duration may be 1 ms.

In an embodiment of the disclosure, the external electronic device 201 may sequentially transmit fourth packets, one for each slot according to information on the number of times of transmission of the fourth packet included in the second information from a slot following a slot (e.g., first slot (slot 0)) in which the third packet is transmitted.

In various embodiments of the disclosure, the external electronic device 201 may be configured to transmit the fourth packet once every several slots (e.g., second slot (slot 1), third slot (slot 2), and fourth slot (slot 3)) from a slot following a slot (e.g., first slot (slot 0)) in which the third packet is transmitted.

In various embodiments of the disclosure, the external electronic device 201 may be configured to transmit a plurality of fourth packets in one slot (e.g., second slot (slot 1)) from a slot following a slot (e.g., first slot (slot 0)) in which the third packet is transmitted.

In an embodiment of the disclosure, the scrambled timestamp sequence index information may be a scrambled timestamp sequence index value to be used in the fourth packet. The SP frame may be transmitted and received in a sequence of pulses generated according to a scrambled timestamp sequence index. Based on the scrambled timestamp sequence index value, a device that has transmitted the UWB advertisement may be identified.

In an embodiment of the disclosure, the SP0 frame may include a MAC layer packet header (MHR). The SP0 frame may include a source address in the MAC layer packet header. The external electronic device 201 and/or the electronic device 101 may identify a device that has transmitted the UWB advertisement based on the source address.

In an embodiment of the disclosure, in operations 503 and 505, the external electronic device 201 may transmit a fourth packet to the electronic device 101 through the communication module (the communication module 190 of FIG. 1) under the control of the processor (the processor 120 of FIG. 1).

Operations 503 and 505 may be an operation in which the external electronic device 201 transmits the fourth packet to the electronic device 101 through the communication module (the communication module 190 of FIG. 1) under the control of the processor (the processor 120 of FIG. 1) based on the second information included in the third packet.

Operations 503 and 505 may be an operation in which the external electronic device 201 transmits the fourth packet to the electronic device 101 through the communication module (the communication module 190 of FIG. 1) under the control of the processor (the processor 120 of FIG. 1) based on information on the number of times of transmission of the fourth packet defined in second information included in the third packet, information on a transmission time interval of a UWB advertisement, information on a transmission time interval of the fourth packet, and/or scrambled timestamp sequence (STS) index information.

In an embodiment of the disclosure, in operation 503, the external electronic device 201 may transmit the fourth packet to the electronic device 101 through the communication module (the communication module 190 of FIG. 1) under the control of the processor (the processor 120 of FIG. 1).

In an embodiment of the disclosure, in operation 505, the external electronic device 201 may transmit a fourth packet to the electronic device 101 through the communication module (the communication module 190 of FIG. 1) under the control of the processor (the processor 120 of FIG. 1).

In an embodiment of the disclosure, in operation 503, the electronic device 101 may receive the fourth packet through the communication module 190 under the control of the processor 120.

In an embodiment of the disclosure, in operation 505, the electronic device 101 may receive the fourth packet through the communication module 190 under the control of the processor 120.

In various embodiments of the disclosure, in operation 503, the external electronic device 201 and the electronic device 101 may transmit and receive the fourth packet in the second slot (e.g., slot 1). For example, when a designated time (e.g., a transmission time interval of a UWB advertisement) has elapsed after transmitting the third packet in operation 501, in operation 503, the external electronic device 201 may transmit the fourth packet, and the electronic device 101 may receive the fourth packet.

In various embodiments of the disclosure, in operation 505, the external electronic device 201 and the electronic device 101 may transmit and receive the fourth packet in a third slot (e.g., slot 2). For example, when a designated time (e.g., a transmission time interval of the fourth packet) has elapsed after transmitting the third packet in operation 503, in operation 505, the external electronic device 201 may transmit the fourth packet and the electronic device 101 may receive the fourth packet.

In an embodiment of the disclosure, in operation 507, the external electronic device 201 may transmit a fifth packet to the electronic device 101 through the communication module (the communication module 190 of FIG. 1) under the control of the processor (the processor 120 of FIG. 1).

In an embodiment of the disclosure, in operation 507, the electronic device 101 may receive the fifth packet through the communication module 190 under the control of the processor 120.

In various embodiments of the disclosure, in operation 507, the external electronic device 201 and the electronic device 101 may transmit and receive the fifth packet in a fifth slot (e.g., slot 4).

In an embodiment of the disclosure, the fifth packet may include data. The fifth packet may include data in the physical layer payload.

For example, the fifth packet may include data as in third data 207. In an embodiment of the disclosure, the fifth packet may include an SP0 frame, an SP1 frame, or an SP2 frame.

In an embodiment of the disclosure, the data included in the fifth packet may be data continuous with the data included in the third packet.

In various embodiments of the disclosure, the data included in the fifth packet may be data discontinuous from the data included in the third packet.

In various embodiments of the disclosure, data transmitted from the external electronic device 201 to the electronic device 101 may be divided and transmitted through the fifth packet as well as the third packet. According to a length of data, not only the fifth packet but also a packet for transmitting data may be added. According to an embodiment of the disclosure, the third packet may include information indicating that data has been divided and/or a time interval in which an additional packet is transmitted.

In various embodiments of the disclosure, the external electronic device 201 may transmit the fifth packet as at least one or more additional packets to the electronic device 101 through the communication module (the communication module 190 of FIG. 1) after transmitting the fourth packet under the control of the processor (the processor 120 of FIG. 1).

Figure 6:
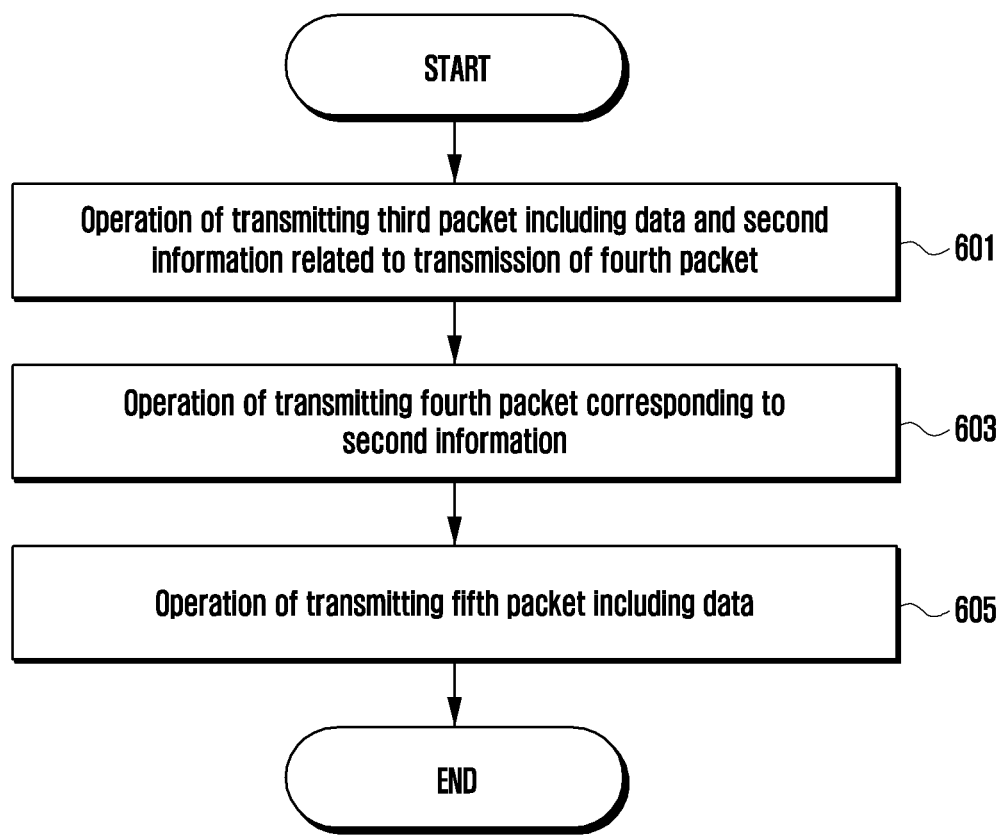
FIG. 6 is a flowchart illustrating an operation in which an external electronic device of FIG. 5 transmits a UWB signal according to an embodiment of the disclosure.

FIG. 6 is a flowchart illustrating an operation in which an external electronic device transmits a UWB signal according to an embodiment of the disclosure.

Referring to FIG. 6, in operation 601, the external electronic device 201 may transmit a third packet including data and second information related to transmission of the fourth packet to the electronic device 101 through the communication module (the communication module 190 of FIG. 1) under the control of the processor (the processor 120 of FIG. 1).

In an embodiment of the disclosure, the third packet and/or the fourth packet may be a UWB advertisement.

In an embodiment of the disclosure, the third packet may be an STS packet configuration (SP) frame including a payload.

For example, the third packet may be an SP0 frame, an SP1 frame, or an SP2 frame.

In an embodiment of the disclosure, the fourth packet may be an STS packet configuration (SP) frame that does not include a payload.

For example, the fourth packet may be an SP3 frame.

In an embodiment of the disclosure, second information related to transmission of the fourth packet may be included in a physical layer payload of the third packet, for example, the SP0 frame, the SP1 frame, or the SP2 frame.

In an embodiment of the disclosure, the second information related to transmission of the fourth packet may include information on the number of times of transmission of the fourth packet. The information on the number of times of transmission of the fourth packet may be information on the number of times of transmission of the fourth packet when transmitting the UWB advertisement. The number of times of transmission of the fourth packet may be, for example, three times. However, the number of times of transmission of the fourth packet is not limited to three times, but may be one or more times.

In various embodiments of the disclosure, the second information related to transmission of the fourth packet may include information on the number of times of transmission of the fourth packet, information on a transmission time interval of a UWB advertisement, information on a transmission time interval of the fourth packet, and/or scrambled timestamp sequence index information.

In various embodiments of the disclosure, the second information related to transmission of the fourth packet may essentially include information on the number of times of transmission of the fourth packet and include at least one of information on a transmission time interval of a UWB advertisement, information on a transmission time interval of the fourth packet, and/or scrambled timestamp sequence (STS) index information.

In an embodiment of the disclosure, data included in the third packet may be included in a physical layer payload of the third packet, the SP0 frame, the SP1 frame, or the SP2 frame.

In an embodiment of the disclosure, data may be transmitted from the external electronic device 201 to the electronic device 101 through a physical layer payload of the third packet.

In an embodiment of the disclosure, data transmitted from the external electronic device 201 to the electronic device 101 may be transmitted only in the third packet. The data may be service data.

In various embodiments of the disclosure, data transmitted from the external electronic device 201 to the electronic device 101 may be divided and transmitted through at least one additional packet as well as the third packet. Data included in the additional packet may be continuous with data included in the third packet. The number of at least one additional packet may be determined according to the divided data. The external electronic device 201 may divide data based on a length of the data under the control of the processor (the processor 120 of FIG. 1) and determine the number of at least one or more additional packets. The external electronic device 201 may transmit at least one additional packet to the electronic device 101 through the communication module (the communication module 190 of FIG. 1) after transmitting the fourth packet under the control of the processor (the processor 120 of FIG. 1).

In various embodiments of the disclosure, data included in the additional packet may be discontinuous with data included in the third packet.

In an embodiment of the disclosure, in operation 603, the external electronic device 201 may transmit a fourth packet corresponding to the second information through the communication module (the communication module 190 of FIG. 1) under the control of the processor (the processor 120 of FIG. 1).

In an embodiment of the disclosure, in operation 603, the external electronic device 201 may transmit the fourth packet according to the number of times of transmission of the fourth packet included in the second information through the communication module (the communication module 190 of FIG. 1) under the control of the processor (the processor 120 of FIG. 1).

In an embodiment of the disclosure, the external electronic device 201 may sequentially transmit fourth packets, one for each slot according to the number of times of transmission of the fourth packet included in the second information from a slot following a slot (e.g., first slot (slot 0)) in which the third packet is transmitted.

According to various embodiments of the disclosure, the external electronic device 201 may be configured to transmit the fourth packet once every several slots (e.g., second slot (slot 1), third slot (slot 2), and fourth slot (slot 3)) from a slot following a slot (e.g., first slot (slot 0)) in which the third packet is transmitted.

In various embodiments of the disclosure, the external electronic device 201 may be configured to transmit a plurality of fourth packets in one slot (e.g., second slot (slot 1)) from a slot following a slot (e.g., first slot (slot 0)) in which the third packet is transmitted.

In an embodiment of the disclosure, in operation 605, the external electronic device 201 may transmit a fifth packet through the communication module (the communication module 190 of FIG. 1) under the control of the processor (the processor 120 of FIG. 1).

In an embodiment of the disclosure, the fifth packet may be an STS packet configuration (SP) frame including a payload.

For example, the fifth packet may be an SP0 frame, an SP1 frame, or an SP2 frame.

In an embodiment of the disclosure, the fifth packet may include data. The fifth packet may include data in the physical layer payload.

In an embodiment of the disclosure, the data included in the fifth packet may be data continuous with the data included in the third packet.

In various embodiments of the disclosure, the data included in the fifth packet may be data discontinuous from the data included in the third packet.

In various embodiments of the disclosure, data transmitted from the external electronic device 201 to the electronic device 101 may be divided and transmitted through the fifth packet as well as the third packet. According to a length of the data, not only the fifth packet but also a packet for transmitting data may be added.

In various embodiments of the disclosure, the external electronic device 201 may transmit a fifth packet as at least one additional packet to the electronic device 101 through the communication module (the communication module 190 of FIG. 1) after transmitting the fourth packet under the control of the processor (the processor 120 of FIG. 1).

Figure 7:
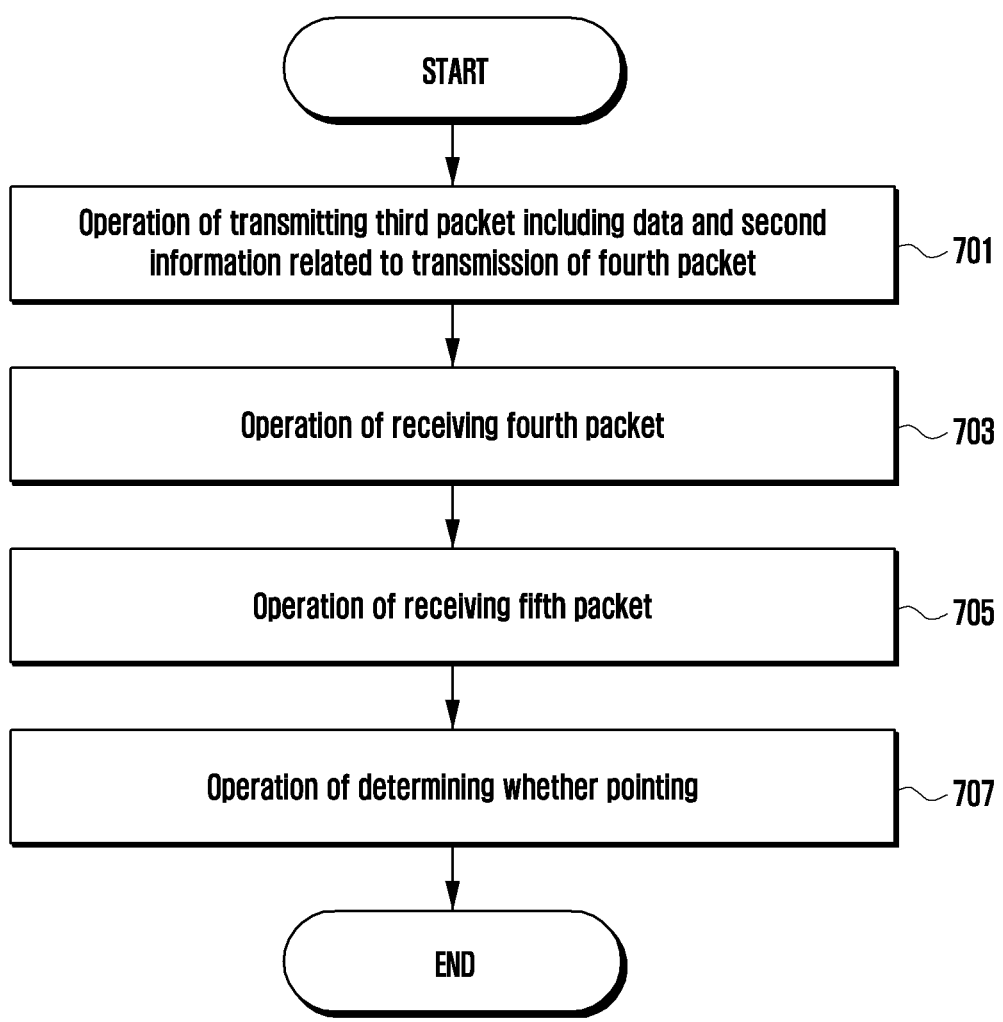
FIG. 7 is a flowchart illustrating an operation in which an electronic device of FIG. 5 manages a UWB signal according to an embodiment of the disclosure.

FIG. 7 is a flowchart illustrating an operation in which an electronic device manages a UWB signal according to an embodiment of the disclosure.

Referring to FIG. 7, in operation 701, the electronic device 101 may receive data and a third packet including second information related to transmission of the fourth packet through the communication module 190 under the control of the processor 120.

In an embodiment of the disclosure, the second information related to transmission of the fourth packet may include information on the number of times of transmission of the fourth packet, information on a transmission time interval of a UWB advertisement, information on a transmission time interval of the fourth packet, and/or scrambled timestamp sequence index information.

In various embodiments of the disclosure, the second information related to transmission of the fourth packet may essentially include information on the number of times of transmission of the fourth packet and include at least one of information on a transmission time interval of a UWB advertisement, information on a transmission time interval of the fourth packet, and/or scrambled timestamp sequence index information.

In an embodiment of the disclosure, second information related to transmission of the fourth packet may include information on the number of times of transmission of the fourth packet. The information on the number of times of transmission of the fourth packet may be information on the number of times of transmission of the fourth packet when transmitting a UWB advertisement. The number of times of transmission of the fourth packet may be, for example, three times. However, the number of times of transmission of the fourth packet is not limited to three times, but may be one or more times.

In an embodiment of the disclosure, in operation 703, the electronic device 101 may receive the fourth packet through the communication module 190 under the control of the processor 120.

In an embodiment of the disclosure, in operation 703, the electronic device 101 may receive at least one fourth packet corresponding to the second information through the communication module 190 under the control of the processor 120.

In an embodiment of the disclosure, in operation 703, the electronic device 101 may receive the fourth packet according to the number of times of transmission of the fourth packet included in the second information through the communication module 190 under the control of the processor 120.

In an embodiment of the disclosure, the third packet may be an STS packet configuration (SP) frame including a payload.

For example, the third packet may be an SP0 frame, an SP1 frame, or an SP2 frame.

In an embodiment of the disclosure, the fourth packet may be an STS packet configuration (SP) frame that does not include a payload.

For example, the fourth packet may be an SP3 frame.

In an embodiment of the disclosure, second information related to transmission of the fourth packet may be included in a physical layer payload of the third packet, for example, the SP0 frame, the SP1 frame, or the SP2 frame.

According to various embodiments of the disclosure, the electronic device 101 may sequentially receive fourth packets, one for each slot according to information on the number of times of transmission of the fourth packet included in the second information from a slot following a slot (e.g., first slot (slot 0)) in which the third packet is transmitted.

In various embodiments of the disclosure, the electronic device 101 may receive the fourth packet once every several slots (e.g., second slot (slot 1), third slot (slot 2), and fourth slot (slot 3)) from a slot following a slot (e.g., first slot (slot 0)) in which the third packet is transmitted.

In various embodiments of the disclosure, the electronic device 101 may receive a plurality of fourth packets in one slot (e.g., second slot (slot 1)) from a slot following a slot (e.g., first slot (slot 0)) in which the third packet is transmitted.

In an embodiment of the disclosure, in operation 705, the electronic device 101 may receive a fifth packet under the control of the processor 120.

In an embodiment of the disclosure, the fifth packet may be an STS packet configuration (SP) frame including a payload.

For example, the fifth packet may be an SP0 frame, an SP1 frame, or an SP2 frame.

In an embodiment of the disclosure, the fifth packet may include data. The fifth packet may include data in a physical layer payload.

In an embodiment of the disclosure, the data included in the fifth packet may be data continuous with the data included in the third packet.

In various embodiments of the disclosure, the data included in the fifth packet may be data discontinuous from the data included in the third packet.

In various embodiments of the disclosure, data transmitted from the external electronic device 201 to the electronic device 101 may be divided and transmitted through the fifth packet as well as the third packet. According to a length of the data, not only the fifth packet but also a packet for transmitting data may be added.

In various embodiments of the disclosure, the external electronic device 201 may transmit a fifth packet as at least one or more additional packets to the electronic device 101 through the communication module (the communication module 190 of FIG. 1) after transmitting the fourth packet under the control of the processor (the processor 120 of FIG. 1).

In an embodiment of the disclosure, in operation 707, the electronic device 101 may determine whether the external electronic device 201 has been pointed under the control of the processor 120.

In an embodiment of the disclosure, the pointing of the external electronic device 201 may be an operation of the external electronic device 201 toward the electronic device 101. In operation 707, the electronic device 101 may estimate an angle of arrival and/or a field of view based on the third packet, the fourth packet, and/or the fifth packet under the control of the processor 120 to determine whether the external electronic device 201 has been pointed.

In an embodiment of the disclosure, in operation 707, the electronic device 101 may determine whether the external electronic device 201 has been pointed based on the third packet, the fourth packet, and/or the fifth packet under the control of the processor 120.

In an embodiment of the disclosure, when receiving the third packet, the fourth packet, and/or the fifth packet under the control of the processor 120 in operation 707, the electronic device 101 may determine whether the external electronic device 201 has been pointed based on the third packet, the fourth packet, and/or the fifth packet.

According to various embodiments of the disclosure, operation 707 of determining whether the external electronic device 201 has been pointed may be performed before operation 705 of receiving the fifth packet. For example, when receiving the third packet and/or the fourth packet under the control of the processor 120, the electronic device 101 may determine whether the external electronic device 201 has been pointed based on the third packet and/or the fourth packet.

In various embodiments of the disclosure, operation 707 of determining whether the external electronic device 201 has been pointed and operation 705 of receiving the fifth packet may be simultaneously performed. For example, the electronic device 101 may determine whether the external electronic device 201 has been pointed based on the third packet and/or the fourth packet during an operation of receiving the fifth packet under the control of the processor 120.

In various embodiments of the disclosure, in operation 707, the electronic device 101 may determine whether the fourth packet has been received from the external electronic device 201 based on the second information included in the third packet under the control of the processor 120 to determine whether the external electronic device 201 has been pointed.

In an embodiment of the disclosure, when receiving the fourth packet from the external electronic device 201 based on the second information included in the third packet, in operation 707, the electronic device 101 may identify an angle of arrival and/or a field of view of the third packet and/or the fourth packet under the control of the processor 120. In operation 707, when it is determined that the third packet and/or the fourth packet have been received in a preconfigured angle of arrival range and/or field of view range under the control of the processor 120, the electronic device 101 may determine that the external electronic device 201 has been pointed.

In an embodiment of the disclosure, when receiving the fourth packet from the external electronic device 201 based on the second information included in the third packet, in operation 707, the electronic device 101 may identify an angle of arrival and/or a field of view of the third packet and/or the fourth packet under the control of the processor 120. In operation 707, when it is determined that the third packet and/or the fourth packet have not been received in a preconfigured angle of arrival range and/or field of view range under the control of the processor 120, the electronic device 101 may determine that the external electronic device 201 has not been pointed.

In an embodiment of the disclosure, the second information may be information on the number of times of transmission of the fourth packet of the external electronic device 201.

In an embodiment of the disclosure, if the number of times of transmission of the fourth packet included in the second information matches the number of times of the received fourth packet, in operation 707, the electronic device 101 may identify an angle of arrival and/or a field of view of the third packet and/or the fourth packet under the control of the processor 120. In operation 707, the electronic device 101 may determine whether the external electronic device 201 has been pointed based on the identified angle of arrival and/or field of view of the third packet and/or fourth packet under the control of the processor 120.

For example, when information on the number of times of transmission of the fourth packet of the external electronic device 201 included in the second information is defined as transmitting the fourth packet three times, and when it is identified that the external electronic device 201 has transmitted the fourth packet three times, in operation 707, the electronic device 101 may identify an angle of arrival and/or a field of view of the third packet and/or the fourth packet under the control of the processor 120 and determine whether the external electronic device 201 has been pointed based on the identified angle of arrival and/or field of view of the third packet and/or the fourth packet.

In an embodiment of the disclosure, the second information may be information on the number of times of transmission of the fourth packet and information on a transmission time interval of the fourth packet of the external electronic device 201.

In an embodiment of the disclosure, if the number of times of transmission of the fourth packet included in the second information matches the number of times of the received fourth packet, and if a transmission time interval of the fourth packet included in the second information matches a transmission time interval of the received fourth packet, in operation 707, the electronic device 101 may identify an angle of arrival and/or a field of view of the third packet and/or the fourth packet under the control of the processor 120. In operation 707, the electronic device 101 may identify an angle of arrival and/or a field of view of the third packet and/or the fourth packet under the control of the processor 120 and determine whether the external electronic device 201 has been pointed based on the identified angle of arrival and/or field of view of the third packet and/or the fourth packet.

For example, information on the number of times of transmission of the fourth packet of the external electronic device 201 included in the second information may be defined as transmitting the fourth packet three times, and information on a transmission time interval of the fourth packet may be defined to transmit four packets at an interval of 1 ms. If it is identified that the external electronic device 201 has transmitted the fourth packet three times at an interval of 1 ms, in operation 707, the electronic device 101 may identify an angle of arrival and/or a field of view of the third packet and/or the fourth packet under the control of the processor 120, and determine whether the external electronic device 201 has been pointed based on the identified angle of arrival and/or field of view of the third packet and/or the fourth packet.

In an embodiment of the disclosure, the second information may include information on the number of times of transmission of the fourth packet and scrambled timestamp sequence index information. In operation 707, the electronic device 101 may determine whether the external electronic device 201 has been pointed based on information on the number of times of transmission of the fourth packet, scrambled timestamp sequence index information included in the second information, and a scrambled timestamp sequence index value included in the fourth packet under the control of the processor 120.

For example, the number of times of reception of the fourth packet may match information on the number of times of transmission of the fourth packet included in the second information, and scrambled timestamp sequence index information may match a scrambled timestamp sequence index value of the fourth packet. If the transmission number of times and the scrambled timestamp sequence index match, in operation 707, the electronic device 101 may identify an angle of arrival and/or a field of view of the third packet and/or the fourth packet under the control of the processor 120 and determine whether the external electronic device 201 has been pointed based on the identified arrival of angle and/or field of view of the third packet and/or the fourth packet.

In an embodiment of the disclosure, if the number of times of the received fourth packet matches in a range of the number of times of transmission of the fourth packet included in the second information, in operation 707, the electronic device 101 may identify an angle of arrival and/or a field of view of the third packet and/or the fourth packet under the control of the processor 120 and determine whether the external electronic device 201 has been pointed based on the identified angle of arrival and/or field of view of the third packet and/or the fourth packet.

In an embodiment of the disclosure, the second information may be information on number of times of transmission of the fourth packet and information on a transmission time interval of the fourth packet of the external electronic device 201.

In an embodiment of the disclosure, if the number of times of transmission of the received fourth packet matches in a range of the number of times of transmission of the fourth packet included in the second information, and if transmission time intervals of the received fourth packet match in a range of the transmission time interval of the fourth packet included in the second information, in operation 707, the electronic device 101 may identify an angle of arrival and/or a field of view of the third packet and/or the fourth packet under the control of the processor 120 and determine whether the external electronic device 201 has been pointed based on the identified angle of arrival and/or field of view of the third packet and/or the fourth packet.

In an embodiment of the disclosure, if the number of times of transmission of the fourth packet and the number of times of the received fourth packet included in the second information are equal to or greater than the designated number of times, in operation 707, the electronic device 101 may identify an angle of arrival and/or a field of view of the third packet and/or the fourth packet under the control of the processor 120. In operation 707, the electronic device 101 may determine whether the external electronic device 201 has been pointed based on the identified angle of arrival and/or field of view of the third packet and/or fourth packet under the control of the processor 120.

For example, when information on the number of times of transmission of the fourth packet of the external electronic device 201 included in the second information is defined as transmitting the fourth packet three times, and when it is identified that the electronic device 101 has been received the fourth packet 2 times or more, in operation 707, the electronic device 101 may identify an angle of arrival and/or a field of view of the third packet and/or the fourth packet under the control of the processor 120 and determine whether the external electronic device 201 has been pointed based on the identified angle of arrival and/or field of view of the third packet and/or the fourth packet.

Figure 8:
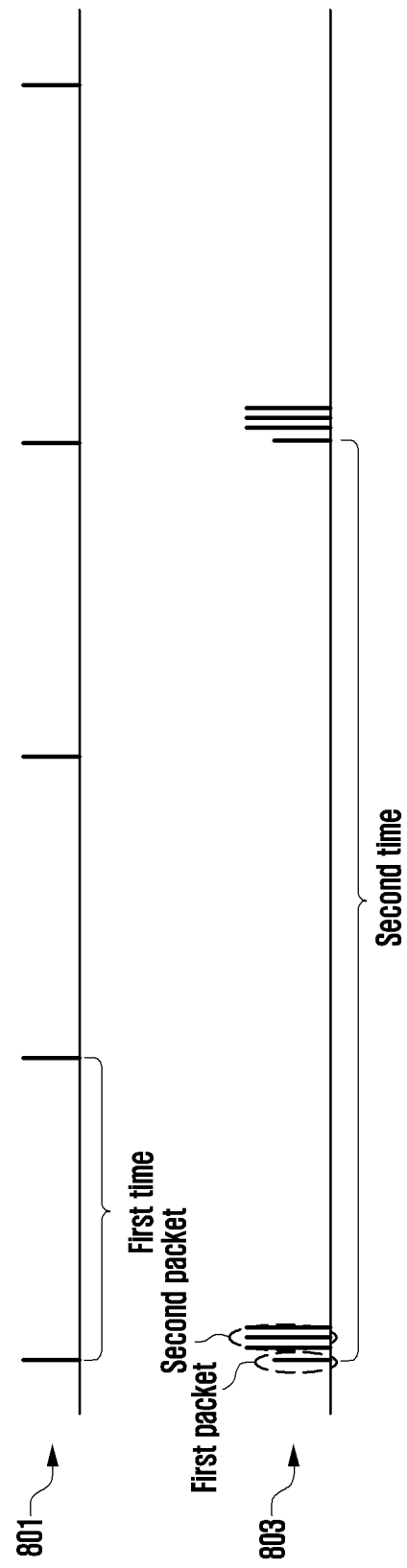
FIG. 8 is a timing diagram illustrating a general UWB advertisement transmission operation and a UWB advertisement transmission operation according to an embodiment of the disclosure.

FIG. 8 is a timing diagram illustrating a UWB advertisement transmission operation according to management of a UWB signal and a general UWB advertisement transmission operation according to an embodiment of the disclosure.

Referring to FIG. 8, with reference to a timing diagram 801 illustrating a general UWB advertisement transmission operation, a UWB advertisement signal configured with one packet may be transmitted every first time (e.g., 300 ms).

With reference to a timing diagram 803 illustrating a UWB advertisement transmission operation according to various embodiments of the disclosure, a UWB advertisement signal constituted with a plurality of packets may be transmitted every second time (e.g., 900 ms).

The second time may be longer than the first time. For example, the second time may be longer than the first time in proportion to the number of a plurality of packets.

For example, the plurality of packets may be the first packet and the second packet described with reference to FIGS. 2 to 4.

In transmission of a UWB advertisement according to various embodiments of the disclosure, a UWB advertisement signal is transmitted every second time, which is a longer period than a first time, which is a general UWB advertisement transmission time, thereby reducing power consumed in the external electronic device 201 and/or the electronic device 101.

In transmission of a general UWB advertisement, a UWB advertisement signal configured with one packet is transmitted, whereas in transmission of a UWB advertisement according to various embodiments of the disclosure, a UWB advertisement signal configured with a plurality of packets is transmitted, whereby the external electronic device 201 and/or the electronic device 101 can accurately estimate an angle of arrival.

In transmission of a UWB advertisement of the disclosure, by transmitting a UWB advertisement signal constituted with a plurality of packets (e.g., second packet or SP3 frame) having a short data length, the external electronic device 201 and/or the electronic device 101 can accurately estimate an angle of arrival and reduce latency in a pointing determination operation.

Figure 9:
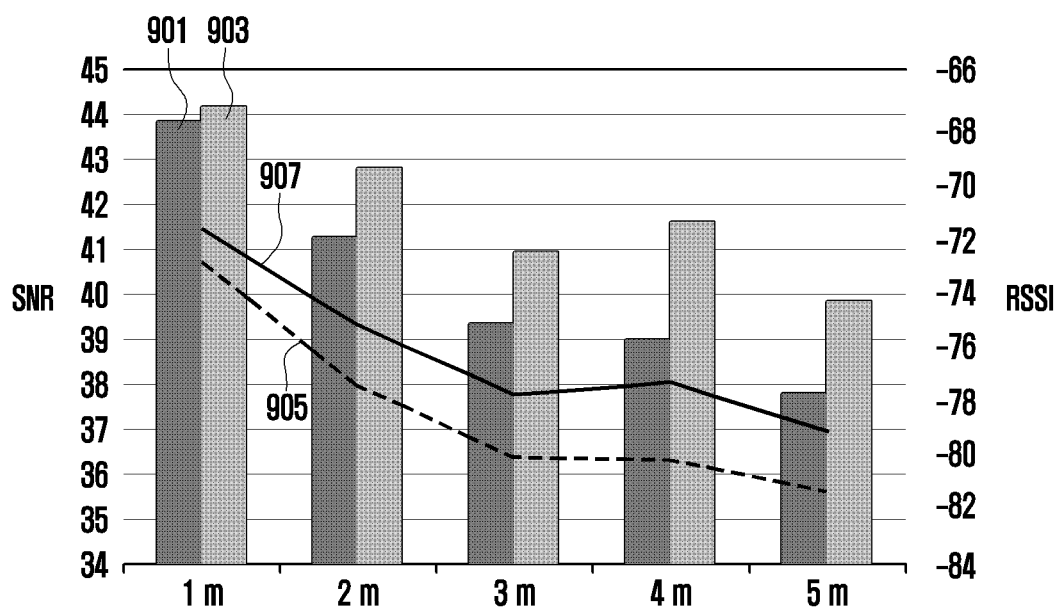
FIG. 9 is a graph illustrating changes in a signal to noise ratio (SNR) and a received signal strength indicator (RSSI) according to a data length included in a payload of a UWB advertisement according to an embodiment of the disclosure.

FIG. 9 is a graph illustrating changes in a signal to noise ratio (SNR) and a received signal strength indicator (RSSI) according to a data length included in a payload of a UWB advertisement according to an embodiment of the disclosure.

Referring to FIG. 9, 901 denotes an SNR according to a data length included in a payload of a general UWB advertisement, and 905 denotes an RSSI according to a data length included in a payload of a general UWB advertisement.

903 denotes an SNR according to a data length included in a payload of a UWB advertisement according to various embodiments of the disclosure, and 907 denotes an RSSI according to a data length included in a payload of a UWB advertisement according to various embodiments of the disclosure.

The data length included in the payload of the general UWB advertisement may be longer than that included in a payload of the UWB advertisement according to various embodiments of the disclosure.

When an SNR 901 according to the data length included in the payload of the general UWB advertisement is compared with an SNR 903 according to the data length included in the payload of the UWB advertisement according to various embodiments of the disclosure, an SNR of the UWB advertisement of the disclosure having a short data length included in the payload of the UWB advertisement may be improved by about 2 dB.

When an RSSI 905 according to the data length included in the payload of the general UWB advertisement is compared with an RSSI 907 according to the data length included in the payload of the UWB advertisement according to various embodiments of the disclosure, the RSSI of the UWB advertisement according to various embodiments of the disclosure having a short data length included in the payload of the UWB advertisement may be improved by about 2 dBm.

In an embodiment of the disclosure, the external electronic device 201 includes a communication module (the communication module 190 of FIG. 1) supporting ultra wideband (UWB) communication and a processor (the processor 120 of FIG. 1) operatively connected to the communication module (the communication module 190 of FIG. 1), wherein the processor (the processor 120 of FIG. 1) controls to transmit a first packet including first information related to transmission of a second packet to the electronic device 101 through the communication module (the communication module 190 of FIG. 1) in a slot corresponding to a transmission time of the first packet and to transmit at least one or more second packets corresponding to the first information to the electronic device 101 through the communication module (the communication module 190 of FIG. 1) in a slot corresponding to a transmission time of the second packet, wherein the first packet is an STS packet configuration (SP) frame including a payload, and the at least one second packet for determining whether pointing is an SP frame that does not include a frame payload.

In an embodiment of the disclosure, the processor (the processor 120 of FIG. 1) of the external electronic device 201 may control to transmit the first packet to the electronic device 101 in a first slot.

In an embodiment of the disclosure, the processor (the processor 120 of FIG. 1) of the external electronic device 201 may be configured to transmit the at least one second packet once every several slots from a slot following the first slot.

In an embodiment of the disclosure, the processor (the processor 120 of FIG. 1) of the external electronic device 201 may be configured to transmit a plurality of second packets in one slot from a slot following the first slot.

In an embodiment of the disclosure, the first information may be included in a physical layer payload of the first packet.

In an embodiment of the disclosure, the first packet may be an SP0 frame, an SP1 frame, and/or an SP2 frame, and further include data in a physical layer payload of the first packet.

In an embodiment of the disclosure, the processor (the processor 120 of FIG. 1) of the external electronic device 201 may be configured to transmit the at least one second packet and then to transmit a third packet including the data to the electronic device 101 through the communication module (e.g., the communication module 190 of FIG. 1).

In an embodiment of the disclosure, the third packet may be an SP0 frame, an SP1 frame, or an SP2 frame.

In an embodiment of the disclosure, the first information may include information on the number of times of transmission of the at least one or more second packets.

In an embodiment of the disclosure, the first information may further include at least one of information on a transmission time interval of a UWB advertisement, information on a transmission time interval of the at least one second packet, and/or scrambled timestamp sequence index information.

In an embodiment of the disclosure, the electronic device 101 may include a communication module 190 for supporting ultra wideband (UWB) communication and a processor 120 operatively connected to the communication module 190, wherein the processor 120 may receive a first packet including first information related to transmission of at least one or more second packets from the external electronic device 201 in a slot corresponding to a transmission time of the first packet through the communication module 190, receive the at least one or more second packets corresponding to the first information from the external electronic device 201 in a slot corresponding to a transmission time of the at least one or more second packets through the communication module 190, determine whether the electronic device points the external electronic device 201 based on the first packet and/or the at least one or more second packets, wherein the first packet may be an SP frame including a payload, and the at least one or more second packets may be an SP frame that does not include a payload.

In an embodiment of the disclosure, the processor 120 of the electronic device 101 may control to receive the first packet from the external electronic device 201 in a first slot.

In an embodiment of the disclosure, the processor 120 of the electronic device 101 may be configured to receive the at least one second packet once every several slots from a slot following the first slot.

In an embodiment of the disclosure, the processor 120 of the electronic device 101 may be configured to receive the at least one or more second packets in one slot from a slot following the first slot.

In an embodiment of the disclosure, the first information may include information on the number of times of transmission of the at least one or more second packets.

In an embodiment of the disclosure, the first information may further include at least one of information on a transmission time interval of a UWB advertisement, information on a transmission time interval of the at least one or more second packets, and/or scrambled timestamp sequence index information.

In an embodiment of the disclosure, if the number of times of the received at least one second packet is in a range of the number of times of transmission of the at least one second packet included in the received first information, the processor 120 of the electronic device 101 may identify an angle of arrival or a field of view of the first packet or the second packet, and determine that the external electronic device 201 has been pointed based on the identified angle of arrival or field of view of the first packet or the second packet.

In an embodiment of the disclosure, if the number of times of the received at least one or more second packets is in a range of the number of times of transmission of the at least one or more second packets included in the received first information, and if a transmission time interval of the received at least one second packet is in a range of a defined time interval, the processor 120 of the electronic device 101 may identify an angle of arrival or a field of view of the first packet or the second packet, and determine that the external electronic device 201 has been pointed based on the identified angle of arrival or field of view of the first packet or the second packet.

In an embodiment of the disclosure, if the number of times of the received at least one or more second packets is in a range of the number of times of transmission of the at least one or more second packets included in the received first information, the processor 120 of the electronic device 101 may identify an angle of arrival or a field of view of the first packet or the second packet based on the scrambled timestamp sequence index information and a scrambled timestamp sequence index value of the at least one or more second packets, and determine whether the external electronic device 201 has been pointed based on the identified angle of arrival or field of view of the first packet or second packet.

In an embodiment of the disclosure, the processor 120 of the electronic device 101 may receive the at least one second packet and then to receive a third packet including data from the external electronic device 201 through the communication module 190, and the third packet may be an SP0 frame, an SP1 frame, or an SP2 frame.

An electronic device according to various embodiments of the disclosure may be various types of devices. The electronic device may include, for example, a portable communication device (e.g., a smart phone), a computer device, a portable multimedia device, a portable medical device, a camera, a wearable device, or a home appliance device. The electronic device according to an embodiment of the disclosure is not limited to the above-described devices.

Various embodiments of the disclosure and terms used therein are not intended to limit technical features described in this document to specific embodiments of the disclosure, but it should be understood to include various modifications, equivalents, or substitutions of the embodiments. In connection with the description of the drawings, like reference numerals may be used for similar or related components. A singular form of the noun corresponding to an item may include one or more of the item, unless the relevant context clearly dictates otherwise. In an embodiment of the disclosure, each of phrases, such as "A or B", "at least one of A and B", "at least one of A or B", "A, B, or C", "at least one of A, B, and C", and "at least one of A, B, or C" may include any one of, or all possible combinations of, items listed together in the corresponding one of the phrases. Terms, such as "first" or "second" may be simply used for distinguishing a corresponding component from other corresponding components, and do not limit the corresponding components in other aspects (e.g., importance or order). When one (e.g., first) component is referred to as "coupled" or "connected" to another (e.g., second) component, with or without the terms "functionally" or "communicatively, it means that the one component may be connected to the other component directly (e.g., by wire), wirelessly, or through a third component.

The term "module" used in various embodiments of the disclosure may include a unit implemented in hardware, software, or firmware, and may be used interchangeably with terms, such as, for example, logic, logic block, part, or circuit. A module may be an integrally formed part or a minimum unit or a portion of the part that performs one or more functions. For example, according to an embodiment of the disclosure, the module may be implemented in the form of an application-specific integrated circuit (ASIC).

Various embodiments of the disclosure may be implemented into software (e.g., the program 140) including one or more instructions stored in a storage medium (e.g., an internal memory 136 or an external memory 138) readable by a machine (e.g., the electronic device 101). For example, the processor (e.g., the processor 120) of the machine (e.g., the electronic device 101) may call and execute at least one command among one or more instructions stored from a storage medium. This makes it possible for the machine to be operated to perform at least one function according to the called at least one instruction. The one or more instructions may include a code generated by a compiler or a code executable by an interpreter. The machine readable storage medium may be provided in the form of a non-transitory storage medium. Here, 'non-transitory' only means that the storage medium is a tangible device and does not include a signal (e.g., electromagnetic wave), and the term does not distinguish a case that data is semi-permanently stored in the storage medium and a case that data is temporarily stored in the storage medium.

According to an embodiment of the disclosure, a method according to various embodiments of the disclosure may be provided as included in a computer program product. Computer program products may be traded between sellers and buyers as commodities. The computer program product may be distributed in the form of a machine readable storage medium (e.g., a compact disc read only memory (CD-ROM)) or may be distributed online (e.g., download or upload) or directly between two user devices (e.g., smartphones) or through an application store (e.g., Play Store™). In the case of online distribution, at least a part of the computer program product may be at least temporarily stored or temporarily generated in a machine readable storage medium, such as a memory of a server of a manufacturer, a server of an application store, or a relay server.

According to various embodiments of the disclosure, each component (e.g., module or program) of the above-described components may include a singular entity or a plurality of entities, and some of the plurality of entities may be separately disposed in other components. According to various embodiments of the disclosure, one or more components or operations among the above-described corresponding components may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component among the plurality of components prior to the integration. According to various embodiments of the disclosure, operations performed by a module, program, or other component may be executed sequentially, in parallel, repeatedly, or heuristically, or one or more operations may be executed in a different order, or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication circuit configured to support ultra wideband (UWB) communication; and
at least one processor operatively connected to the communication circuit,
wherein the at least one processor is configured to control to:
transmit, to an external electronic device, a first packet including first information related to transmission of a second packet through the communication circuit in a slot duration of a slot, the slot duration corresponding to a transmission time of the first packet, and
transmit, to the external electronic device, at least one or more second packets corresponding to the first information through the communication circuit in a slot duration of a slot, the slot duration corresponding to a transmission time of the second packet,
wherein the first packet is a scrambled timestamp sequence (STS) packet configuration (SP) frame including a payload, and
wherein at least one or more second packets is an SP frame that does not include a frame payload.

2. The electronic device of claim 1, wherein the at least one processor is further configured to control to transmit the first packet to the external electronic device in a first slot.

3. The electronic device of claim 2, wherein the at least one processor is further configured to transmit the at least one or more second packets once every several slots from a slot following the first slot.

4. The electronic device of claim 2, wherein the at least one processor is further configured to transmit the at least one or more second packets in one slot from a slot following the first slot.

5. The electronic device of claim 1, wherein the first information is included in a physical layer payload of the first packet.

6. The electronic device of claim 1,
wherein the first packet is an STS packet configuration zero (SP0) frame, an STS packet configuration one (SP1) frame, and/or an STS packet configuration two (SP2) frame, and
wherein the first packet further comprises data in a physical layer payload thereof.

7. The electronic device of claim 6, wherein the at least one processor is further configured to:
transmit the at least one or more second packets, and
transmit a third packet including the data to the external electronic device through the communication circuit.

8. The electronic device of claim 7, wherein the third packet is the SP0 frame, the SP1 frame, or the SP2 frame.

9. The electronic device of claim 1, wherein the first information comprises information on a number of times of transmission of the at least one or more second packets.

10. The electronic device of claim 9, wherein the first information further comprises at least one of:
information on a transmission time interval of a UWB advertisement;
information on a transmission time interval of the at least one or more second packets; or
scrambled timestamp sequence index information.

11. An electronic device comprising:
a communication circuit configured to support ultra wideband (UWB) communication; and
at least one processor operatively connected to the communication circuit,
wherein the at least one processor is configured to control to:
receive, from an external electronic device, a first packet including first information related to transmission of at least one or more second packets in a slot duration of a slot, the slot duration corresponding to a transmission time of the first packet through the communication circuit,
receive, from the external electronic device, the at least one or more second packets corresponding to the first information in a slot duration of a slot, the slot duration corresponding to a transmission time of the at least one or more second packets through the communication circuit, and
determine whether the electronic device points the external electronic device based on the first packet and/or the at least one or more second packets,
wherein the first packet is a scrambled timestamp sequence (STS) packet configuration (SP) frame including a payload, and
wherein the at least one or more second packets is an SP frame that does not include a payload.

12. The electronic device of claim 11, wherein the at least one processor is further configured to control to receive the first packet from the external electronic device in a first slot.

13. The electronic device of claim 12, wherein the at least one processor is further configured to receive the at least one or more second packets once every several slots from a slot following the first slot.

14. The electronic device of claim 12, wherein the at least one processor is further configured to receive the at least one or more second packets in one slot from a slot following the first slot.

15. The electronic device of claim 11, wherein the first information comprises information on a number of times of transmission of the at least one or more second packets.

16. The electronic device of claim 15, wherein the first information further comprises at least one of:
information on a transmission time interval of a UWB advertisement;
information on a transmission time interval of the at least one or more second packets; or
scrambled timestamp sequence index information.

17. The electronic device of claim 15,
wherein, if the number of times of a received at least one second packet is in a range of the number of times of transmission of the at least one second packet included in the received first information,
wherein the at least one processor is further configured to:
identify an angle of arrival or a field of view of the first packet or the second packet, and
determine that the external electronic device has been pointed based on the identified angle of arrival or field of view of the first packet or the second packet.

18. The electronic device of claim 16, wherein, if the number of times of a received at least one second packet is in a range of the number of times of transmission of the at least one second packet included in the received first information, and if a transmission time interval of the received at least one or more second packets is in a range of a defined time interval, the at least one processor is further configured to:
identify an angle of arrival or a field of view of the first packet or the second packet, and
determine that the external electronic device has been pointed based on the identified angle of arrival or field of view of the first packet or the second packet.

19. The electronic device of claim 16, wherein, if the number of times of a received at least one second packet is in a range of the number of times of transmission of the at least one or more second packets included in the received first information, the at least one processor is further configured to:
identify an angle of arrival or a field of view of the first packet or the second packet based on the scrambled timestamp sequence index information and a scrambled timestamp sequence index value of the at least one or more second packets, and
determine whether an external electronic device has been pointed based on the identified angle of arrival or field of view of the first packet or the second packet.

20. The electronic device of claim 11,
wherein the at least one processor is further configured to:
receive the at least one or more second packets, and
receive a third packet including data from the external electronic device through the communication circuit, and
wherein the third packet is an STS packet configuration zero (SP0) frame, an STS packet configuration one (SP1) frame, or an STS packet configuration two (SP2) frame.

* * * * *